United States Patent [19]

Wilke

[11] 4,441,469
[45] Apr. 10, 1984

[54] STRATIFIED FUEL INJECTION FOR GASEOUS FUEL INTERNAL COMBUSTION ENGINE

[75] Inventor: Charles F. Wilke, Allegany, N.Y.

[73] Assignee: Dresser Industries, Inc., Dallas, Tex.

[21] Appl. No.: 323,786

[22] Filed: Nov. 23, 1981

[51] Int. Cl.³ .............................................. F02B 3/02
[52] U.S. Cl. ..................................... 123/295; 123/261
[58] Field of Search ............... 123/295, 260, 261, 275, 123/277, 286, 288, 256, 270, 293, 310

[56] References Cited

U.S. PATENT DOCUMENTS

| 3,257,994 | 6/1966 | Clements et al. | 123/261 |
| 4,020,817 | 5/1977 | Noguchi et al. | 123/261 |
| 4,149,495 | 4/1979 | Miura | 123/261 |
| 4,270,499 | 6/1981 | Frelund | 123/261 |

Primary Examiner—Raymond A. Nelli
Attorney, Agent, or Firm—Daniel Rubin

[57] ABSTRACT

A main combustion chamber and a pair of dual ignition antechambers are contained in the engine head associated with each of the engine cylinders with the antechambers in flow communication with the main combustion chamber. A main fuel injection valve is positioned recessed within the cylinder head displaced from the surface of the main combustion chamber for discharging injected fuel in an axial direction to stratify the fuel with respect to air contained in the chamber. During the subsequent compression stroke, a quantity of air surrounding the stratified fuel is forced into the antechambers for mixing with combustible quantities of fuel subsequently supplied. Ignition thereafter of the air-fuel mixture in the antechambers in turn ignites the air-fuel mixture in the main combustion chamber to effect the expansion stroke of the engine.

11 Claims, 3 Drawing Figures

STRATIFIED FUEL INJECTION FOR GASEOUS FUEL INTERNAL COMBUSTION ENGINE

BACKGROUND OF THE INVENTION

Gaseous fuel engines are available from a variety of manufacturers and typically operate with such fuels as methane, ethane, propane, butane and/or mixtures thereof, including natural gas. In recent years increasingly stringent government regulation has forced the engine manufacturers of both gaseous and liquid fuels to changes in operation and/or construction that are increasingly effective toward more complete combustion for effecting both reductions in $NO_x$ emission levels and increased economy of operation. Various approaches toward that end have been disclosed in a variety of U.S. patents, as exemplified by U.S. Pat. Nos. 3,924,582; 3,963,003; and 3,967,611.

SUMMARY OF THE INVENTION

The invention relates to improvements in a gaseous fueled, multi-cylinder internal combustion engine and more specifically to improvements for such engines affording increased reductions in $NO_x$ emission levels along with greater economy of operation. This is achieved in accordance herewith by means of a pair of dual ignition antechambers, each communicating through a selectively sized orifice with the dome surface of the main combustion chamber contained in the engine head. Gaseous fuel is supplied to the main combustion chamber through an injection valve, the discharge end of which is displaced inward of the dome surface. This enables the fuel to be discharged in an axial direction so as to concentrate in a mass that centrally stratifies with respect to the air contained in the main combustion chamber. In the course of the compression stroke that follows, air at the dome surface is forced from the main combustion chamber through the orifices into the antechambers prior to receipt of a fuel gas supply thereto. Ignition of the air fuel mixture in the antechambers spews the flames outward through the orifices to in turn ignite the air-fuel mixture in the main combustion chamber for effecting the expansion stroke.

It is therefore an object of the invention to provide a more consistent burning internal combustion engine for effecting reduced $NO_x$ levels therefrom.

It is a further object of the invention to effect the previous object with concomitant increases in economy of operation.

It is a still further object of the invention to provide a novel method for effecting the foregoing objects.

Figure 1:
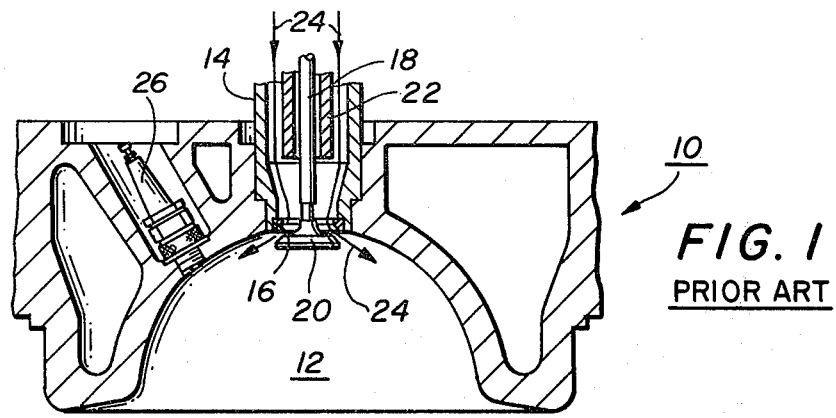
FIG. 1 is a fragmentary sectional elevation through a prior art cylinder head of a gaseous fuel two-cycle internal combustion engine.

Referring first to FIG. 1, there is disclosed a power cylinder head of the prior art for a multi-cylinder engine being of a type commercially available and designated 10. Typically, a cylinder head of the type illustrated is contained on a two-cycle internal combustion engine operated with methane fuel at a NEMA 80° F. rating in excess of 3,000 brake-horsepower. The head is of cast construction that includes a main combustion chamber 12 of a domed configuration.

Centrally located extending through the upper surface of the dome from a location generally co-extensive therewith is a stepped tubular insert 14 supporting a beveled valve seat 16 at its lower end. Adapted to cooperate with valve seat 16 for supply of gaseous fuel is a gas injection valve 18 having a head 20. The valve stem is reciprocally guided in sleeve 22 in a well known manner to timely inject fuel in quantities required for combustion. On emerging through the open valve between head 20 and seat 16, the fuel is annularly dispersed in the direction generally represented by arrows 24 for mixing with air in the combustion chamber before being ignited by spark plug 26.

Figure 2:
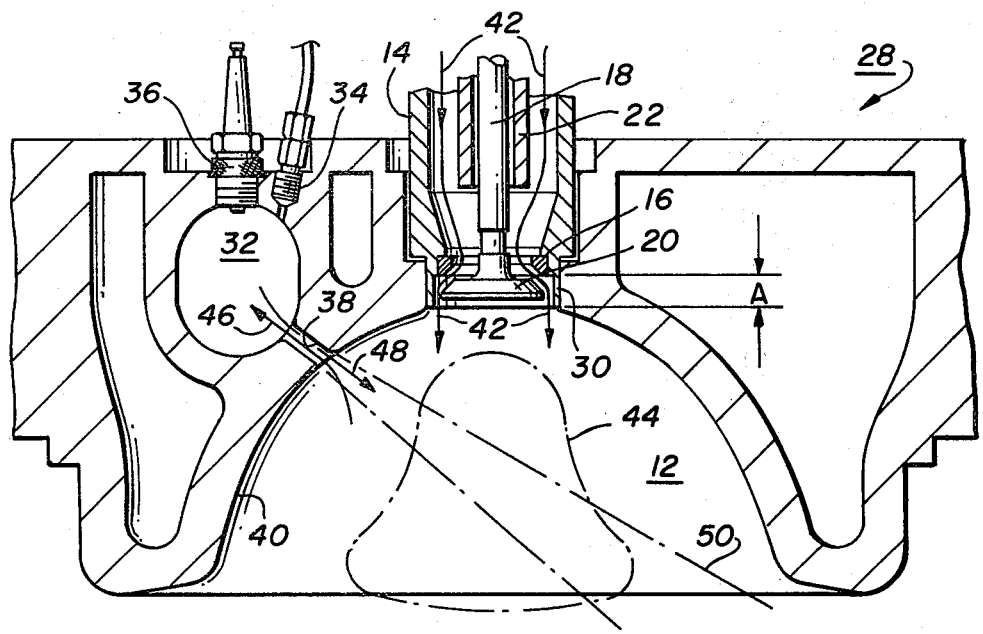
FIG. 2 is a fragmentary sectional elevation similar to FIG. 1 at an enlarged scale for a cylinder head modified in accordance with the invention.

Referring now to FIG. 2, the power cylinder head thereshown is designated 28 and comprises a modification of cylinder head 10 described above. Combustion chamber 12 is similarly dome shaped or such other shape affording sufficient clearance to permit fuel stratification to occur as will be understood. Comprising the modification is the relative location of valve seat 16 on insert 14 a recessed distance "A" inward of the head displaced from the dome surface. Beneath seat 16 insert 14 includes a tubular portion 30 extending axially to the dome surface of main combustion chamber 12. Likewise included is a pair of dual ignition antechambers 32, of which only one is shown. Each of the antechambers is supplied with fuel via separate gas injection valves 34, and are adapted when mixed with air to a combustible mixture to be ignited by a spark plug 36. Providing flow communication between main chamber 12 and each antechamber 32 is a selectively sized orifice 38 extending through head wall 40. The total antechamber volume should be about 1–8 percent of the volume of main combustion chamber 12 and in the preferred embodiment two antechambers 32 are utilized, each corresponding to about 2–3 percent of the volume of main combustion chamber 12.

Dimension "A" is critical to operation hereof by affording extension 30 sufficient length in an axial direction for the injected gas flow to emerge substantially axially as represented by arrows 42. This in turn is dependent on the angle of the cooperating surfaces of seat 16 and valve head 20. For a 45 degree surface angle dimension "A" is required to be at least about ⅜ inches, while for greater seat angles dimension "A" would be correspondingly greater and for smaller angles dimension "A" would be correspondingly less. While it is essential that the minimum dimension "A" be sufficient for extension 30 to impart an axial direction to gas flow 42, any increase of dimension "A" above the minimum is limited only by practical considerations of manufacture.

Similarly, the size of orifice 38 is critical, for reasons as will be understood, in order to permit proper quantities of air to enter while ensuring controlled flame projection therefrom. Depending on the size of main combustion chamber 12 and the number of utilized antechambers 32, orifice 38 usually varies from about 5/16 inch diameter to about ⅛ inch diameter.

In operation, power cylinder head 28 of FIG. 2 provides for injection of fuel 42 through fuel injection valve 18 past seat 16. The fuel on emerging therefrom is forced to impinge on extension 30 so as to assume an axial direction and remain in a concentrated mass that substantially stratifies within main combustion chamber 12 as represented by the phantom inverted mushroom outline 44. During the compression stroke which follows, air contained along the dome surface of the main combustion chamber surrounding the fuel concentration as represented by arrow 46 is forced through orifices 38 into both antechambers 32. After gaseous fuel is supplied to the antechambers via gas injection valves 34, each mixture is ignited by means of a spark plug 36. Hot gases and/or flames jetting outward through orifice 38, as represented by arrow 48, follow a path generally contained between the diverging phantom lines 50 to ignite the fuel air mixture in main chamber 12. For this reason, orifice 38 should preferably be sized as discussed supra and oriented to afford a flame projection that penetrates and terminates within the stratified zone 44.

Figure 3:
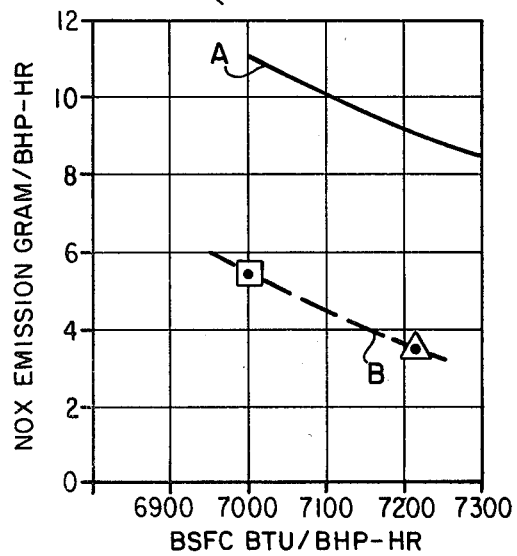
FIG. 3 is a graph of emission performance comparing $NO_x$ emission of an engine using a prior art cylinder head versus the cylinder head of the invention.

The difference in performance between the cylinder heads of FIGS. 1 and 2 can be readily appreciated by reference to the graph of FIG. 3. As thereshown, the curve designated A represents a standard power cylinder head in accordance with the prior art embodiment of FIG. 1, and the curve designated B represents a modified power cylinder head in accordance with the inventive embodiment of FIG. 2 at various brake specific fuel consumptions (BSFC) BTU/BHP-HR. Both curves A and B were established at standard 80° F. NEMA ratings at 3240 BHP using methane fuel. From a comparison of curves A and B, it can be seen that the $NO_x$ level emission of the latter is approximately one-half of the former. At the same time, a fuel saving between the operations of curves A and B was in the range of about 5–7 percent.

By the above description there is disclosed novel method and apparatus for reducing $NO_x$ emissions while increasing economy of a gas fueled internal combustion engine. By means of relatively simple and minor modifications to the power cylinder head utilized on such engines, the $NO_x$ emission characteristics are substantially enhanced in accordance with current trends and criteria for the industry. At the same time, by virtue of the simplicity of the change, these results are achieved at relatively modest cost. Moreover, the advantages afforded thereby can be readily obtained on either two-cycle or four-cycle engines.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a two cycle internal combustion engine having at least one power cylinder and a head secured in position opposite said cylinder defining a main combustion chamber relative to the power cylinder thereat, the combination of:
   (a) at least one antechamber defined in said head at a location displaced from said main combustion chamber;
   (b) orifice means defining a flow passage between said main combustion chamber and said at least one antechamber, said orifice means being sized to pass controlled quantities of air for combustion from said main combustion chamber to said at least one antechamber during the compression stroke of the engine and to provide controlled flame projection outward from said at least one antechamber into an air-fuel mixture in said main combustion chamber after an air-fuel mixture in said at least one antechamber has been ignited;
   (c) gas injection means for injecting gaseous fuel separately into each of said main combustion chamber and said at lest one antechamber in timed relation to each other, said gas injection means being operative before the compression stroke of the engine to inject fuel into said main combustion chamber in a substantially concentrated mass distribution stratified therein at a location displaced from said orifice means and operative after the compression stroke of the engine to inject fuel into said at least one antechamber to effect a combustible air-fuel mixture therein; and
   (d) spark ignition means associated in ignition relation with the combustible air-fuel mixture in said at least one antechamber and operative when energized to precipitate the expansion stroke of the engine.

2. In an internal combustion engine having at least one power cylinder and a head secured in postion opposite said cylinder defining a main combustion chamber relative to the power cylinder thereat, the combination of:
   (a) at least one antechamber defined in said head at a location displaced from said main combustion chamber;
   (b) orifice means defining a flow passage between said main combustion chamber and said at least one antechamber, said orifice means being sized to pass controlled quantities of air for combustion from said main combustion chamber to said at least one antechamber during the compression stroke of the engine and to provide controlled flame projection outward from said at least one antechamber into an air-fuel mixture in said main combustion chamber after an air-fuel mixture in said at least one antechamber has been ignited;
   (c) gas injection means for injecting gaseous fuel separately into each of said main combustion chamber and said at least one antechamber in timed relation to each other, said gas injection means being operative before the compression stroke of the engine to inject fuel into said main combustion chamber in a substantially concentrated mass distribution stratified therein at a location displaced from said orifice means and operative after the compression stroke of the engine to inject fuel into said at least one antechamber to effect a combustible air-fuel mixture therein; said gas injection means including a first gas injection valve for injecting gasous fuel into said main combustion chamber and a second gas injection valve for injecting gaseous fuel into said at least one antechamber, said first gas injection valve being located within said head with its discharge opening displaced from the surface plane of said main combustion chamber a predetermined distance sufficient for the injected gas to inject inward of said main combustion chamber in a substantially locally stratified concentrated mass; and
   (d) spark ignition means associated in ignition relation with the combustible air-fuel mixture in said at least one antechamber and operative when energized to precipitate the expansion stroke of the engine.

3. In an internal combustion engine according to claim 2 in which the said discharge opening of said first injection valve is recessed within said head a distance as measured longitudinally from the surface plane of said main combustion chamber to the outermost plane of the valve seat of at least ⅜ inches.

4. In an internal combustion engine according to claim 2 in which the volume of said at least one antechamber is in the range of one to eight percent of the volume of said main combustion chamber.

5. In an internal combustion engine according to claims 1, 2, 3 or 4 in which said at least one antechamber comprises a pair of antechambers, and said orifice means includes separate orifices defining a flow passage between each individual of said antechambers and said main combustion chamber.

6. In an internal combustion engine according to claim 5 in which each of said antechambers includes said spark ignition means for effecting dual ignition operation of said power cylinder.

7. In an internal combustion engine according to claim 5 in which the volume of each of said antechambers is in the range of two to three percent of the volume of said main combustion chamber.

8. In an internal combustion engine according to claim 7 in which the size of each of said orifices is effective to provide a flame projection sufficient to penetrate the stratified fuel mass location in said main combustion chamber to ignite the air-fuel mixture thereat for effecting the expansion stroke of the engine.

9. In an internal combustion engine having at least one power cylinder and a head secured in position opposite said cylinder defining a main combustion chamber relative to the power cylinder thereat and at least one antechamber in flow communication with said main combustion chamber, a method of combustion comprising the steps of:
(a) injecting a combustible quantity of gaseous fuel into said main combustion chamber in a manner providing local stratification therein of the injected fuel gas;
(b) permitting the subsequent compression stroke of the engine to force air from a volume portion of said main combustion chamber removed from the stratified volume of the injected fuel gas into said at least one antechamber;
(c) injecting a combustible quantity of gaseous fuel into said at least one antechamber; and
(d) igniting the air fuel mixture in said at least one antechamber for the flame thereof to in turn ignite the air fuel mixture in said main combustion chamber.

10. In an internal combustion engine according to claim 9 in which said at least one antechamber comprises a pair of antechambers and said method of combustion ignition step includes dual ignition of the combustible air fuel mixture of said pair of antechambers.

11. In a two cycle internal combustion engine having at least one power cylinder and a head secured in position opposite said cylinder defining a main combustion chamber relative to the power cylinder thereat, the combination of:
(a) at least one antechamber defined in said head at a location displaced from said main combustion chamber;
(b) orifice means defining a flow passage between said main combustion chamber and said at least one antechamber, said orifice means being sized to pass controlled quantities of air for combustion from said main combustion chamber to said at least one antechamber during the compression stroke of the engine and to provide controlled flame projection outward from said at least one antechamber into an air-fuel mixture in said main combustion chamber after an air-fuel mixture in said at least one antechamber has been ignited;
(c) gas injection means for injecting gaseous fuel separately into each of said main combustion chamber and said at least one antechamber in timed relation to each other; and
(d) spark ignition means associated in ignition relation with the combustible air-fuel mixture in said at least one antechamber and operative when energized to precipitate the expansion stroke of the engine.

* * * * *